US009756326B2

(12) United States Patent
Ho et al.

(10) Patent No.: US 9,756,326 B2
(45) Date of Patent: Sep. 5, 2017

(54) VIDEO CODING METHOD USING AT LEAST EVALUATED VISUAL QUALITY AND RELATED VIDEO CODING APPARATUS

(71) Applicant: MEDIATEK INC., Hsin-Chu (TW)

(72) Inventors: Cheng-Tsai Ho, Taichung (TW); Chi-Cheng Ju, Hsinchu (TW); Ding-Yun Chen, Taipei (TW)

(73) Assignee: MEDIATEK INC., Hsin-Chu (TW)

( * ) Notice: Subject to any disclaimer, the term of this patent is extended or adjusted under 35 U.S.C. 154(b) by 374 days.

(21) Appl. No.: 14/201,950

(22) Filed: Mar. 10, 2014

(65) Prior Publication Data

US 2014/0254689 A1   Sep. 11, 2014

Related U.S. Application Data

(60) Provisional application No. 61/776,053, filed on Mar. 11, 2013.

(51) Int. Cl.
*H04N 19/46* (2014.01)
*H04N 11/04* (2006.01)
(Continued)

(52) U.S. Cl.
CPC ..... *H04N 19/00066* (2013.01); *H04N 19/117* (2014.11); *H04N 19/154* (2014.11);
(Continued)

(58) Field of Classification Search
CPC ....... H04N 19/00545; H04N 19/00066; H04N 19/196; H04N 19/82; H04N 19/154; H04N 19/117
(Continued)

(56) References Cited

U.S. PATENT DOCUMENTS 6,160,846 A * 12/2000 Chiang ............... H04N 19/517
                                               375/240.05
6,233,283 B1    5/2001 Chiu
(Continued)

FOREIGN PATENT DOCUMENTS

CN    1471319 A    1/2004
CN    1669338 A    9/2005
(Continued)

OTHER PUBLICATIONS

"International Search Report" mailed on Jun. 30, 2014 for International application No. PCT/CN2014/073176, International filing date:Mar. 11, 2014.
(Continued)

*Primary Examiner* — Hee-Yong Kim
(74) *Attorney, Agent, or Firm* — Winston Hsu

(57) ABSTRACT

A video coding method includes at least the following steps: utilizing a visual quality evaluation module for evaluating visual quality based on data involved in a coding loop; and referring to at least the evaluated visual quality for deciding a target bit allocation of a rate-controlled unit in video coding. Besides, a video coding apparatus has a visual quality evaluation module, a rate controller and a coding circuit. The visual quality evaluation module evaluates visual quality based on data involved in a coding loop. The rate controller refers to at least the evaluated visual quality for deciding a target bit allocation of a rate-controlled unit. The coding circuit has the coding loop included therein, and encodes the rate-controlled unit according to the target bit allocation.

22 Claims, 5 Drawing Sheets

(51) Int. Cl.
*H04N 7/12* (2006.01)
*H04N 7/26* (2006.01)
*H04N 7/50* (2006.01)
*H04N 19/117* (2014.01)
*H04N 19/196* (2014.01)
*H04N 19/154* (2014.01)
*H04N 19/82* (2014.01)
*H04N 19/18* (2014.01)

(52) U.S. Cl.
CPC .......... *H04N 19/196* (2014.11); *H04N 19/82* (2014.11); *H04N 19/18* (2014.11); *H04N 19/46* (2014.11)

(58) Field of Classification Search
USPC .................................................. 375/240.26
See application file for complete search history.

(56) References Cited

U.S. PATENT DOCUMENTS

| | | |
|---|---|---|
| 7,742,532 B2 | 6/2010 | Jeon |
| 7,873,727 B2 | 1/2011 | Pal |
| 8,077,775 B2 | 12/2011 | He |
| 8,111,300 B2 | 2/2012 | Hwang |
| 8,345,777 B2 | 1/2013 | Lee |
| 9,282,328 B2 | 3/2016 | Chen |
| 2003/0128754 A1 | 7/2003 | Akimoto |
| 2003/0206587 A1 | 11/2003 | Gomila |
| 2003/0206664 A1 | 11/2003 | Gomila |
| 2004/0114817 A1 | 6/2004 | Jayant |
| 2004/0156559 A1 | 8/2004 | Cheng |
| 2004/0208392 A1 | 10/2004 | Raveendran |
| 2005/0243915 A1 | 11/2005 | Kwon |
| 2006/0114997 A1 | 6/2006 | Lelescu |
| 2006/0215766 A1* | 9/2006 | Wang .................. H04N 19/147 375/240.24 |
| 2006/0238445 A1 | 10/2006 | Wang |
| 2008/0069247 A1 | 3/2008 | He |
| 2008/0117981 A1 | 5/2008 | Lee |
| 2008/0240252 A1 | 10/2008 | He |
| 2009/0323803 A1 | 12/2009 | Gomila |
| 2010/0220796 A1 | 9/2010 | Yin |
| 2010/0296588 A1 | 11/2010 | Fujii |
| 2011/0033119 A1 | 2/2011 | Rezazadeh |
| 2011/0211637 A1 | 9/2011 | Blum |
| 2011/0222607 A1 | 9/2011 | An |
| 2011/0235715 A1* | 9/2011 | Chien ................. H04N 19/176 375/240.16 |
| 2011/0255589 A1* | 10/2011 | Saunders ............ H04N 19/176 375/240.01 |
| 2011/0280321 A1 | 11/2011 | Chou |
| 2012/0082241 A1 | 4/2012 | Tsai |
| 2012/0163452 A1 | 6/2012 | Horowitz |
| 2012/0177104 A1 | 7/2012 | Budagavi |
| 2012/0201475 A1 | 8/2012 | Carmel |
| 2012/0257681 A1 | 10/2012 | Sato |
| 2012/0328004 A1 | 12/2012 | Coban |
| 2012/0328029 A1 | 12/2012 | Sadafale |
| 2013/0051454 A1 | 2/2013 | Sze |
| 2013/0051455 A1 | 2/2013 | Sze |
| 2013/0083844 A1 | 4/2013 | Chong |
| 2013/0094569 A1 | 4/2013 | Chong |
| 2013/0094572 A1 | 4/2013 | Van der Auwera |
| 2013/0177068 A1 | 7/2013 | Minoo |
| 2013/0243090 A1 | 9/2013 | Li |
| 2013/0318253 A1 | 11/2013 | Kordasiewicz |
| 2013/0343447 A1 | 12/2013 | Chen |
| 2014/0002670 A1 | 1/2014 | Kolarov |
| 2014/0056363 A1 | 2/2014 | He |
| 2014/0160239 A1 | 6/2014 | Tian |
| 2014/0254659 A1 | 9/2014 | Ho |
| 2014/0254662 A1 | 9/2014 | Ho |
| 2014/0254663 A1 | 9/2014 | Ho |
| 2014/0254680 A1 | 9/2014 | Ho |
| 2014/0254689 A1 | 9/2014 | Ho |
| 2014/0321552 A1 | 10/2014 | He |
| 2014/0334559 A1 | 11/2014 | Kim |
| 2016/0044332 A1 | 2/2016 | Maaninen |

FOREIGN PATENT DOCUMENTS

| | | |
|---|---|---|
| CN | 1694500 A | 11/2005 |
| CN | 1695164 A | 11/2005 |
| CN | 101090502 A | 12/2007 |
| CN | 101232619 A | 7/2008 |
| CN | 101325711 A | 12/2008 |
| CN | 101489130 A | 7/2009 |
| CN | 102150429 A | 8/2011 |
| CN | 102415088 A | 4/2012 |
| CN | 102685472 A | 9/2012 |
| WO | 2013030833 A1 | 3/2013 |
| WO | 2013074365 A1 | 5/2013 |

OTHER PUBLICATIONS

"International Search Report" mailed on Jun. 23, 2014 for International application No. PCT/CN2014/073146, International filing date:Mar. 10, 2014.

"International Search Report" mailed on Jun. 13, 2014 for International application No. PCT/CN2014/073171, International filing date:Mar. 11, 2014.

"International Search Report" mailed on Jun. 3, 2014 for International application No. PCT/CN2014/073178, International filing date: Mar. 11, 2014.

"International Search Report" mailed on Jun. 18, 2014 for International application No. PCT/CN2014/073167, International filing date:Mar. 11, 2014.

Chikkerur et al., "Objective Video Quality Assessment Methods: A Classification, Review, and Performance Comparison", IEEE Transactions on Broadcasting, vol. 57, No. 2, Jun. 2011, p. 165-182.

Chih-Ming Fu et al., "Sample Adaptive Offest for HEVC", 2011 IEEE.

* cited by examiner

VIDEO CODING METHOD USING AT LEAST EVALUATED VISUAL QUALITY AND RELATED VIDEO CODING APPARATUS

CROSS REFERENCE TO RELATED APPLICATIONS

This application claims the benefit of U.S. provisional application No. 61/776,053, filed on Mar. 11, 2013 and incorporated herein by reference.

BACKGROUND

The disclosed embodiments of the present invention relate to video coding, and more particularly, to a video coding method using at least evaluated visual quality determined by one or more visual quality metrics and a related video coding apparatus.

The conventional video coding standards generally adopt a block based (or coding unit based) coding technique to exploit spatial redundancy. For example, the basic approach is to divide the whole source frame into a plurality of blocks (coding units), perform prediction on each block (coding unit), transform residues of each block (coding unit) using discrete cosine transform, and perform quantization and entropy encoding. Besides, a reconstructed frame is generated in a coding loop to provide reference pixel data used for coding following blocks (coding units). For certain video coding standards, in-loop filter(s) may be used for enhancing the image quality of the reconstructed frame. For example, a de-blocking filter is included in an H.264 coding loop, and a de-blocking filter and a sample adaptive offset (SAO) filter are included in an HEVC (High Efficiency Video Coding) coding loop.

For many applications (e.g., a video streaming application), the transmission channel in used typically has a limited transmission bandwidth. Under this circumstance, the encoder's output bitrate must be regulated to meet the transmission bandwidth requirement. Thus, rate control may play an important role in video coding. In general, the conventional rate control algorithm performs the bit allocation based on pixel-based distortion such as spatial activity (image complexity) of a source frame to be encoded. However, the pixel-based distortion merely considers source content complexity, and sometimes is not correlated to the actual visual quality of a reconstructed frame generated from decoding an encoded frame. Specifically, based on experimental results, different processed images, each derived from an original image and having the same distortion (e.g., the same mean square error (MSE)) with respect to the original image, may present different visual quality to a viewer. That is, the smaller pixel-based distortion does not mean better visual quality in the human visual system. Hence, an encoded frame generated due to the conventional distortion-based rate control mechanism does not guarantee that a reconstructed frame generated from decoding the encoded frame would have the best visual quality.

SUMMARY

In accordance with exemplary embodiments of the present invention, a video coding method using at least evaluated visual quality obtained by one or more visual quality metrics and a related video coding apparatus are proposed.

According to a first aspect of the present invention, an exemplary video coding method is disclosed. The exemplary video coding method includes: utilizing a visual quality evaluation module for evaluating visual quality based on data involved in a coding loop; and referring to at least the evaluated visual quality for deciding a target bit allocation of a rate-controlled unit in video coding.

According to a second aspect of the present invention, an exemplary video coding apparatus is disclosed. The exemplary video coding apparatus includes a visual quality evaluation module, a rate controller and a coding circuit. The visual quality evaluation module is arranged to evaluate visual quality based on data involved in a coding loop. The rate controller is arranged to refer to at least the evaluated visual quality for deciding a target bit allocation of a rate-controlled unit. The coding circuit has the coding loop included therein, and is arranged to encode the rate-controlled unit according to the target bit allocation.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

The concept of the present invention is to incorporate characteristics of a human visual system into a video coding procedure to improve the video compression efficiency or visual quality. More specifically, visual quality evaluation is involved in the video coding procedure such that a reconstructed frame generated from decoding an encoded frame is capable of having enhanced visual quality. Further details of the proposed visual quality based video coding design are described as below.

Figure 1:
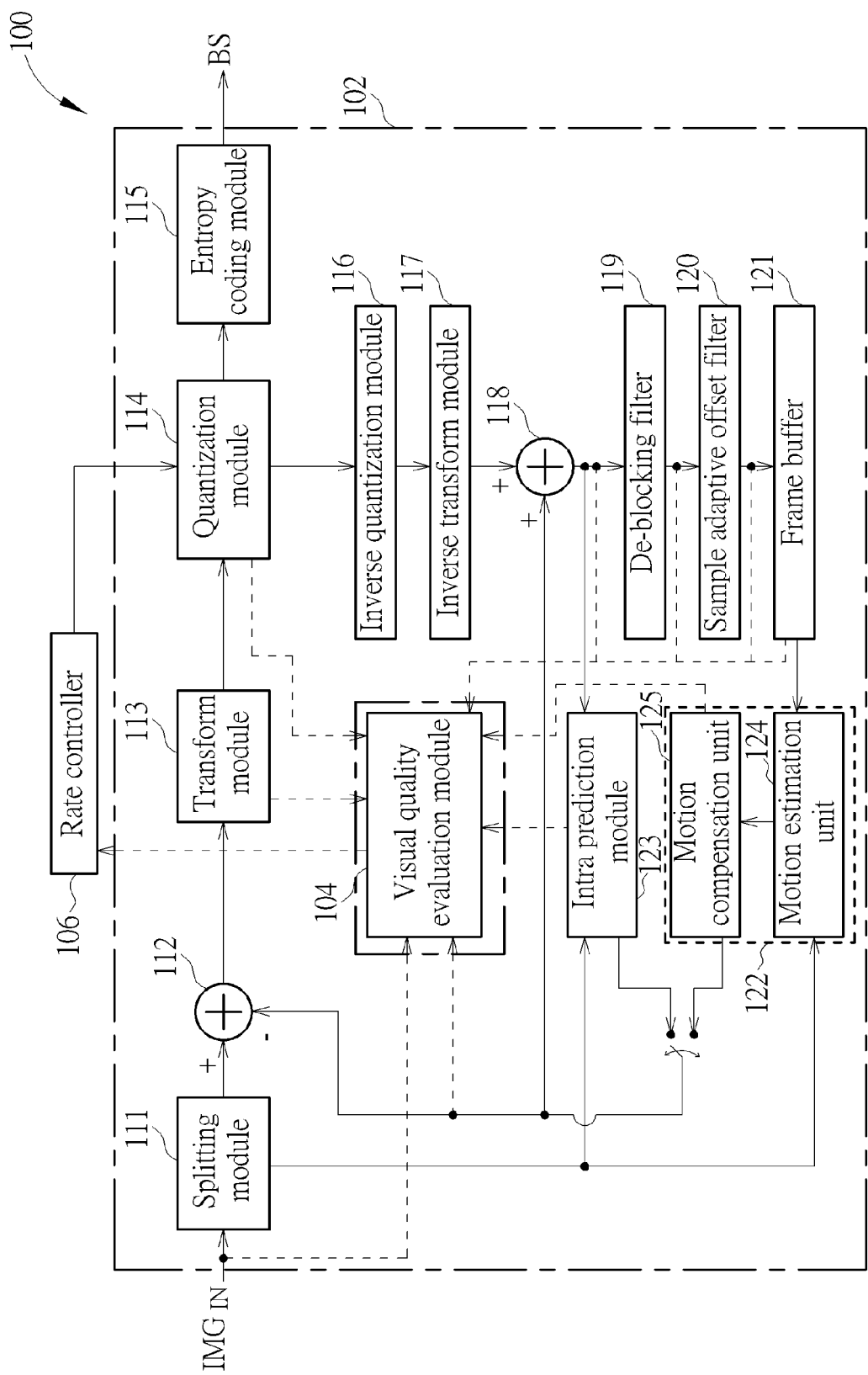
FIG. 1 is a block diagram illustrating a video coding apparatus according to an embodiment of the present invention.

FIG. 1 is a block diagram illustrating a video coding apparatus according to an embodiment of the present invention. The video coding apparatus 100 is used to encode a source frame $IMG_{IN}$ to generate a bitstream BS carrying encoded frame information corresponding to the source frame $IMG_{IN}$. In this embodiment, the video coding apparatus 100 includes a coding circuit 102, a visual quality evaluation module 104 and a rate controller 106. By way of example, but not limitation, the architecture of the coding circuit 102 may be configured based on any conventional video encoding architecture. It should be noted that the coding circuit 102 may follow the conventional video encoding architecture to have a plurality of processing stages implemented therein; however, this by no means implies that each of the processing stages included in the coding circuit 102 must be implemented using a conventional design. For example, the quantization 114 is controlled by the rate controller 106 configured to a proposed visual quality based rate control algorithm of the present invention. Hence, a quantization step used by the quantization 114 for quantizing transformed coefficients of a rate-controlled unit (e.g., one coding unit or one frame) is determined based on a bit allocation of the rate-controlled unit that is decided by the rate controller 106.

As shown in FIG. 1, the coding circuit 102 includes a coding loop composed of a splitting module 111, a subtractor (i.e., an adder configured to perform a subtraction operation) 112, a transform module 113, a quantization module 114, an inverse quantization module 116, an inverse transform module 117, an adder 118, a de-blocking filter 119, a sample adaptive offset (SAO) filter 120, a frame buffer 121, an inter prediction module 122, and an intra prediction module 123, where the inter prediction module 122 includes a motion estimation unit 124 and a motion compensation unit 125. The coding circuit 102 further includes an entropy coding module 115 arranged to generate the bitstream BS by performing entropy encoding upon quantized coefficients generated from the quantization module 114 controlled by the rate controller 106. It should be noted that one or both of the de-blocking filter 119 and the SAO filter 120 may be omitted/bypassed for certain applications. That is, the de-blocking filter 119 and/or the SAO filter 120 may be optional, depending upon actual design requirement. As a person skilled in the pertinent art should readily understand fundamental operations of the processing stages included in the coding circuit 102, further description is omitted here for brevity. Concerning the rate controller 106 that is affected/controlled by the visual quality determined by the visual quality evaluation module 104, further description will be given later.

One key feature of the present invention is using the visual quality evaluation module 104 to evaluate visual quality based on data involved in the coding loop of the coding circuit 102. In one embodiment, the data involved in the coding loop and processed by the visual quality evaluation module 104 may be raw data of the source frame $IMG_{IN}$. In another embodiment, the data involved in the coding loop and processed by the visual quality evaluation module 104 may be processed data derived from raw data of the source frame $IMG_{IN}$. For example, the processed data used to evaluate the visual quality may be transformed coefficients generated by the transform module 113, quantized coefficients generated by the quantization module 114, reconstructed pixel data before the optional de-blocking filter 119, reconstructed pixel data after the optional de-blocking filter 119, reconstructed pixel data before the optional SAO filter 120, reconstructed pixel data after the optional SAO filter 120, reconstructed pixel data stored in the frame buffer 121, motion-compensated pixel data generated by the motion compensation unit 125, or intra-predicted pixel data generated by the intra prediction module 123.

The visual quality evaluation performed by the visual quality evaluation module 104 may calculate one or more visual quality metrics to decide one evaluated visual quality. For example, the evaluated visual quality is derived from checking at least one image characteristic that affects human visual perception, and the at least one image characteristic may include sharpness, noise, blur, edge, dynamic range, blocking artifact, mean intensity (e.g., brightness/luminance), color temperature, scene composition (e.g., landscape, portrait, night scene, etc.), human face, animal presence, image content that attracts more or less interest (e.g., region of interest (ROI)), spatial masking (i.e., human's visual insensitivity of more complex texture), temporal masking (i.e., human's visual insensitivity of high-speed moving object), or frequency masking (i.e., human's visual insensitivity of higher pixel value variation). By way of example, the noise metric may be obtained by calculating an ISO 15739 visual noise value VN, where $VN=\sigma_{L^*}+0.852 \cdot \sigma_{u^*}+0.323 \cdot \sigma_{u^*}$. Alternatively, the noise metric may be obtained by calculating other visual noise metric, such as an S-CIELAB metric, a vSNR (visual signal-to-noise ratio) metric, or a Keelan NPS (noise power spectrum) based metric. The sharpness/blur metric may be obtained by measuring edge widths. The edge metric may be a ringing metric obtained by measuring ripples or oscillations around edges.

In one exemplary design, the visual quality evaluation module 104 calculates a single visual quality metric (e.g., one of the aforementioned visual quality metrics) according to the data involved in the coding loop of the coding circuit 102, and determines each evaluated visual quality solely based on the single visual quality metric. In other words, one evaluated visual quality may be obtained by referring to a single visual quality metric only.

In another exemplary design, the visual quality evaluation module 104 calculates a plurality of distinct visual quality metrics (e.g., many of the aforementioned visual quality metrics) according to the data involved in the coding loop of the coding circuit 102, and determines each evaluated visual quality based on the distinct visual quality metrics. In other words, one evaluated visual quality may be obtained by referring to a composition of multiple visual quality metrics. For example, the visual quality evaluation module 104 may be configured to assign a plurality of pre-defined weighting factors to multiple visual quality metrics (e.g., a noise metric and a sharpness metric), and decide one evaluated visual quality by a weighted sum derived from the weighting factors and the visual quality metrics. For another example, the visual quality evaluation module 104 may employ a Minkowski equation to determine a plurality of non-linear weighting factors for the distinct visual quality metrics, respectively; and then determine one evaluated visual quality by combining the distinct visual quality metrics according to respective non-linear weighting factors. Specifically, based on the Minkowski equation, the evaluated visual quality $\Delta Q_m$ is calculated using following equation:

$$\Delta Q_m = \left( \sum_i (\Delta Q_i)^{n_m} \right)^{1/n_m}, \text{ where } n_m = 1 + 2 \cdot \tanh\left( \frac{(\Delta Q)_{max}}{16.9} \right),$$

$\Delta Q_i$ is derived from each of the distinct visual quality metrics, and 16.9 is a single universal parameter based on psychophysical experiments. For yet another example, the visual quality evaluation module 104 may employ a training-based manner (e.g., a support vector machine (SVM)) to determine a plurality of trained weighting factors for the distinct visual quality metrics, respectively; and then determine one evaluated visual quality by combining the distinct visual quality metrics according to respective trained weighting factors. Specifically, supervised learning models with associated learning algorithms are employed to analyze the distinct visual quality metrics and recognized patterns, and accordingly determine the trained weighting factors.

After the evaluated visual quality is generated by the visual quality evaluation module 104, the evaluated visual quality is referenced by the rate controller 106 to perform rate control for regulating the bitrate of the bitstream BS generated from the video coding apparatus 100. As the evaluated visual quality is involved in making the bit allocation decision for rate control, the source frame $IMG_{IN}$ is encoded based on characteristics of the human visual system to thereby allow a decoded/reconstructed frame to have enhanced visual quality. By way of example, but not limitation, the bitrate of the bitstream BS may be regulated to achieve constant visual quality, thus allowing smooth video playback at a receiving end of the bitstream BS.

More specifically, the rate controller 106 is arranged for referring to at least the evaluated visual quality to decide a target bit allocation of a rate-controlled unit, where the rate-controlled unit may be one coding unit in the source frame $IMG_{IN}$ or the whole source frame $IMG_{IN}$. The coding circuit 100 is arranged to encode the rate-controlled unit according to the target bit allocation. Specifically, after the target bit allocation of the rate-controlled unit is determined by the rate controller 106, size of the quantization step for quantizing transformed coefficients generated from the transform module 113 is properly selected in response to the target bit allocation.

Figure 2:
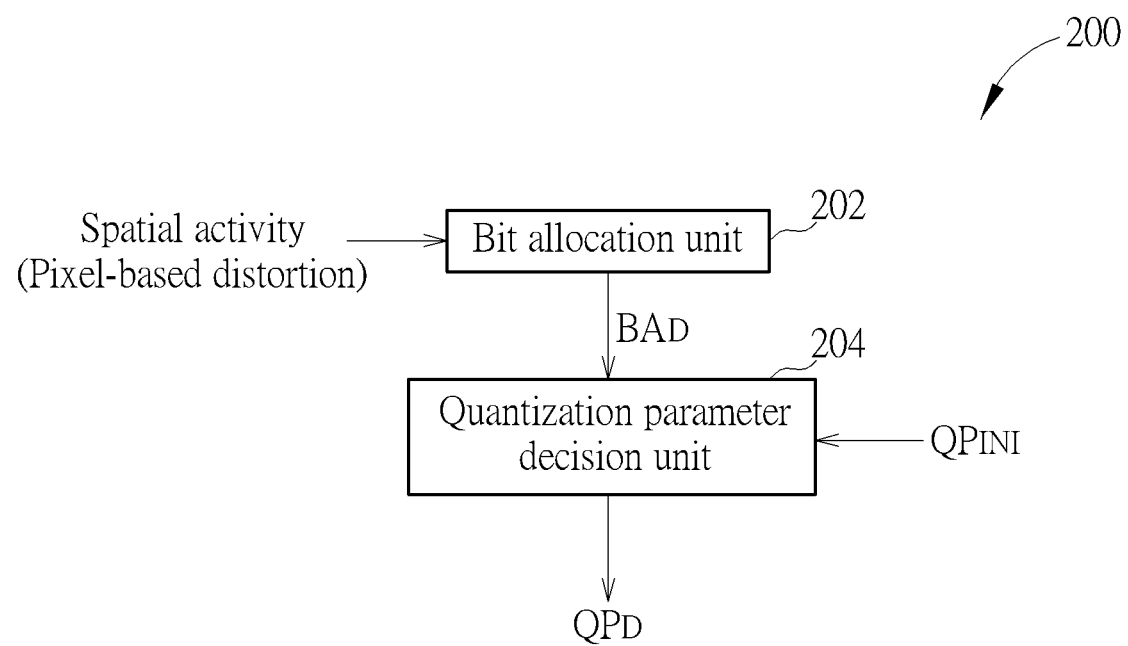
FIG. 2 is a diagram illustrating a conventional distortion-based rate controller.
Figure 3:
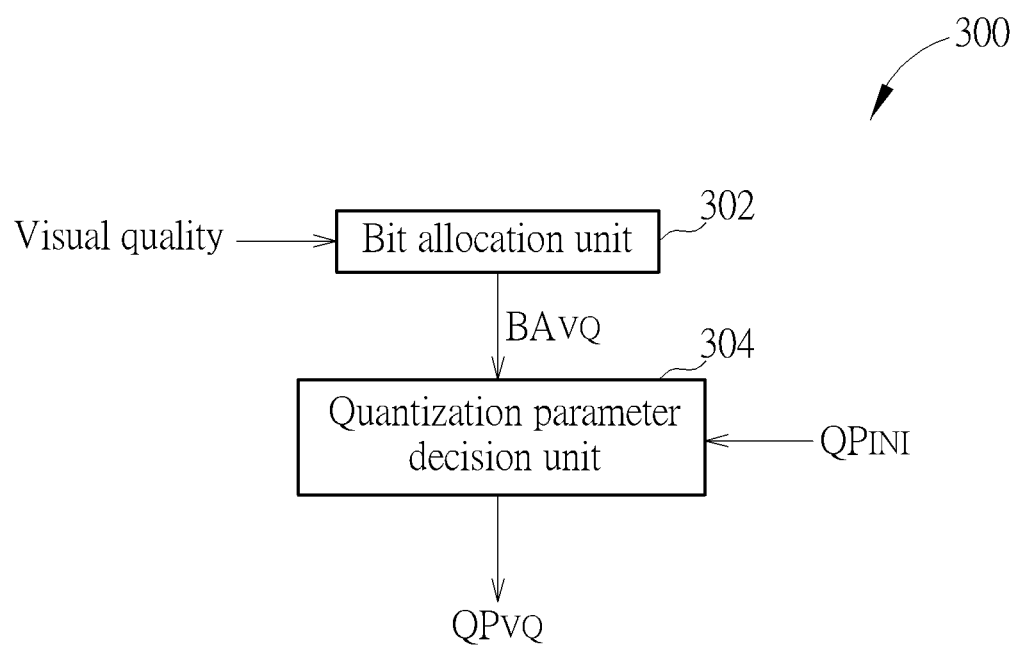
FIG. 3 is a diagram illustrating a proposed rate controller according to an embodiment of the present invention.

Please refer to FIG. 2 and FIG. 3. FIG. 2 is a diagram illustrating a conventional distortion-based rate controller. FIG. 3 is a diagram illustrating a proposed rate controller according to an embodiment of the present invention. The distortion-based rate controller 200 includes a bit allocation unit 202 and a quantization parameter decision unit 204. The bit allocation unit 202 decides a bit allocation $BA_D$ for a rate-controlled unit (e.g., a group of pixels, one coding unit, or one frame) in the source frame $IMG_{IN}$ based on the spatial activity, where the spatial activity is pixel-based distortion simply derived from estimating pixel variance of the rate-controlled unit. In other words, the pixel-based distortion may be regarded as an indicator of complexity of image contents possessed by the rate-controlled unit. The quantization parameter decision unit 204 receives an initial quantization parameter $QP_{INI}$ and the bit allocation $BA_D$, and accordingly determines a quantization parameter $QP_D$ referenced for quantizing transformed coefficients of the rate-controlled unit. The quantization parameter decides the value of the quantization step. It should be noted that image complexity of a frame is not correlated to image quality of the frame in the human visual system. Hence, the bit allocation $BA_D$ is decided without actually considering the human visual perception. As a result, a decoded frame/reconstructed frame derived from decoding an encoded frame generated by an encoder with distortion-based rate control is not ensured to have good visual quality.

In contrast to the distortion-based rate control, the visual quality based rate control proposed by the present invention uses the evaluated visual quality VQ (C or R') derived from data involved in the coding loop of the coding unit 102 to decide a target bit allocation of a rate-controlled unit (e.g., one coding unit or one frame), where the evaluated visual quality VQ (C or R') may be obtained by a single visual quality metric or a composition of multiple visual quality metrics, R' represents processed data derived from raw data of the source frame $IMG_{IN}$ (particularly, processed data derived from processing pixel data of the rate-controlled unit in the source frame $IMG_{IN}$), and C represents raw data of the source frame $IMG_{IN}$ (particularly, pixel data of the rate-controlled unit in the source frame $IMG_{IN}$). In one exemplary design, the rate controller 106 shown in FIG. 1 may be implemented using the visual quality based rate controller 300 shown in FIG. 3. The visual quality based rate controller 300 includes a bit allocation unit 302 and a quantization parameter decision unit 304. The bit allocation unit 302 decides a target bit allocation $BA_{VQ}$ of a rate-controlled unit (e.g., a group of pixels, one coding unit, or one frame) in the source frame $IMG_{IN}$ based on visual quality evaluated for the rate-controlled unit. The quantization parameter decision unit 304 receives an initial quantization parameter $QP_{INI}$ and the bit allocation $BA_{VQ}$, and accordingly determines a quantization parameter $QP_{VQ}$ referenced for quantizing transformed coefficients of the rate-controlled unit. The quantization parameter decides the value of the quantization step used by the quantization module 114. As the bit allocation $BA_{VQ}$ is decided by considering the human visual perception, a decoded frame/reconstructed frame derived from decoding an encoded frame generated by an encoder with visual quality based rate control would have desired visual quality.

Figure 4:
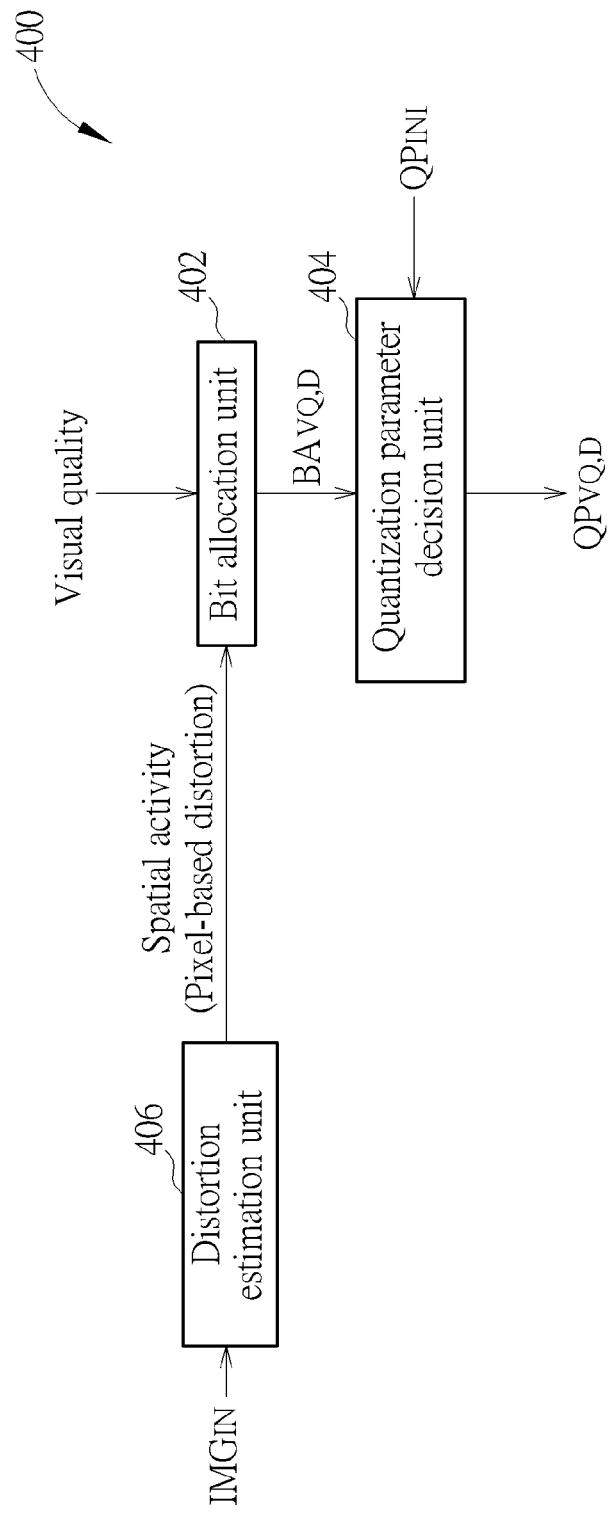
FIG. 4 is a diagram illustrating another proposed rate controller according to an embodiment of the present invention.

In an alternative design, both of the evaluated visual quality (e.g., a single visual quality metric or a composition of multiple visual quality metrics) and the pixel-based distortion (e.g., spatial activity or image complexity) may be involved in deciding a target bit allocation for a rate-controlled unit of the source frame $IMG_{IN}$, where the rate-controlled unit may be one coding unit or one frame. Please refer to FIG. 4, which is a diagram illustrating another proposed rate controller according to an embodiment of the present invention. In another exemplary design, the rate controller 106 shown in FIG. 1 may be implemented using the rate controller 400 shown in FIG. 4. The rate controller 400 includes a distortion estimation unit 406, a bit allocation unit 402 and a quantization parameter decision unit 404. For example, the distortion estimation unit 406 is arranged to calculate pixel-based distortion based on at least a portion (i.e., part or all) of raw data of the source frame $IMG_{IN}$. In a case where a rate-controlled unit is a coding unit, the distortion estimation unit 406 may determine the pixel-based distortion by estimating image complexity of partial raw data of the source frame $IMG_{IN}$ (e.g., calculating pixel variance of the coding unit within the source frame $IMG_{IN}$). In another case where a rate-controlled unit is a frame, the distortion estimation unit 406 may determine the pixel-based distortion by estimating image complexity of all raw data of the source frame $IMG_{IN}$ (e.g., calculating pixel variance of the source frame $IMG_{IN}$). The quantization parameter decision unit 404 receives an initial quantization parameter $QP_{INI}$ and a target bit allocation $BA_{VQ,D}$, and accordingly determines a quantization parameter $QP_{VQ,D}$ referenced for quantizing transformed coefficients of the rate-controlled unit. Specifically, the quantization parameter decides the value of the quantization step used by the quantization module 114.

Concerning the bit allocation unit 402, it decides the target bit allocation $BA_{VQ,D}$ according to the evaluated visual quality and the calculated pixel-based distortion for the rate-controlled unit. For example, the bit allocation unit 402 refers to the evaluated visual quality to find a first bit allocation (e.g., $BA_{VQ}$ in FIG. 3), refers to the pixel-based distortion to find a second bit allocation (e.g., $BA_D$ in FIG.

2), and finally selects one of the first bit allocation and the second bit allocation as the target bit allocation $BA_{VQ,D}$.

For another example, the bit allocation unit 402 performs a coarse decision according to one of the evaluated visual quality and the pixel-based distortion to select M coarse bit allocations (i.e., rough coded bit lengths) from all possible N bit allocations, and performs a fine decision according to another of the evaluated visual quality and the pixel-based distortion to determine P fine bit allocations (i.e., accurate coded bit lengths) from the coarse bit allocations (N>M & M>P≥1), wherein the target bit allocation $BA_{VQ,D}$ is derived from the P fine bit allocations. In a case where P=1, the target bit allocation $BA_{VQ,D}$ is directly determined by the fine decision based on the pixel-based distortion if the coarse decision is made based on the evaluated visual quality; or the target bit allocation $BA_{VQ,D}$ is directly determined by the fine decision based on the evaluated visual quality if the coarse decision is made based on the pixel-based distortion.

Figure 5:
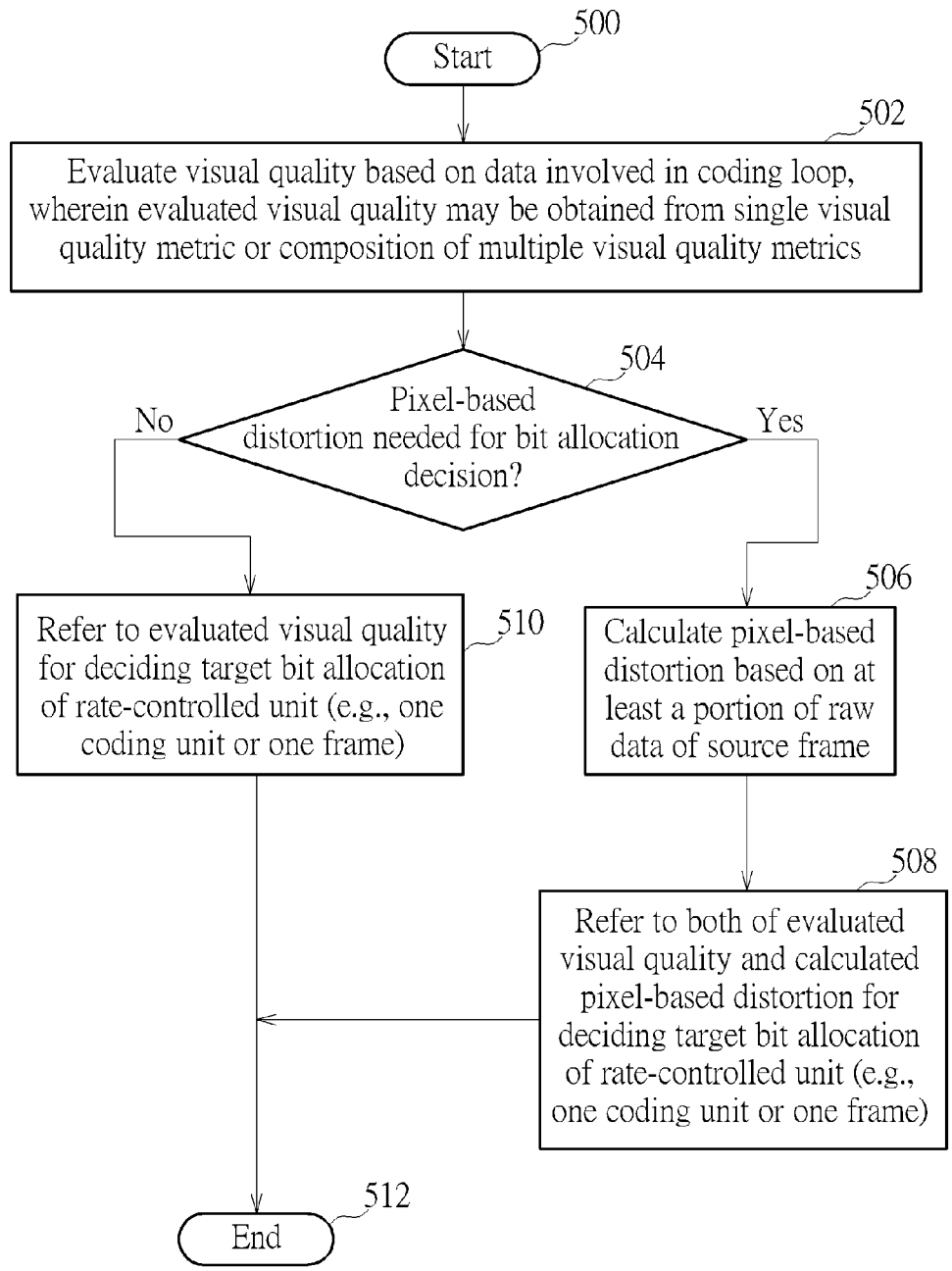
FIG. 5 is a flowchart illustrating a video coding method according to an embodiment of the present invention.

FIG. 5 is a flowchart illustrating a video coding method according to an embodiment of the present invention. Provided that the result is substantially the same, the steps are not required to be executed in the exact order shown in FIG. 5. The video coding method may be briefly summarized as below.

Step 500: Start.

Step 502: Evaluate visual quality based on data involved in a coding loop, wherein the data involved in the coding loop may be raw data of a source frame or processed data derived from the raw data of the source frame, and each evaluated visual quality may be obtained from a single visual quality metric or a composition of multiple visual quality metrics.

Step 504: Check if pixel-based distortion should be used for bit allocation decision. If yes, go to step 506; otherwise, go to step 510.

Step 506: Calculate the pixel-based distortion based on at least a portion of raw data of the source frame.

Step 508: Refer to both of the evaluated visual quality and the calculated pixel-based distortion for decoding a target bit allocation of a rate-controlled unit. For example, the rate-controlled unit may be one coding unit or one frame. Go to step 512.

Step 510: Refer to the evaluated visual quality for deciding a target bit allocation of a rate-controlled unit. For example, the rate-controlled unit may be one coding unit or one frame.

Step 512: End.

As a person skilled in the art can readily understand details of each step in FIG. 5 after reading above paragraphs, further description is omitted here for brevity.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A video coding method, comprising:
calculating pixel-based distortion by estimating pixel variance of a rate-controlled unit in a source frame;
utilizing a visual quality evaluation circuit for evaluating visual quality based on data involved in a coding loop; and
referring to at least the evaluated visual quality and the pixel-based distortion for deciding a target bit allocation of the rate-controlled unit in video coding, comprising:
performing a coarse decision according to one of the evaluated visual quality and the pixel-based distortion to determine a plurality of coarse bit allocations; and
performing a fine decision according to another of the evaluated visual quality and the pixel-based distortion to determine at least one fine bit allocation from the coarse bit allocations, wherein the target bit allocation is derived from the at least one fine bit allocation.

2. The video coding method of claim 1, wherein the rate-controlled unit is one coding unit or one frame.

3. The video coding method of claim 1, wherein the data involved in the coding loop is raw data of the source frame.

4. The video coding method of claim 1, wherein the data involved in the coding loop is processed data derived from raw data of the source frame.

5. The video coding method of claim 4, wherein the processed data includes transformed coefficients, quantized coefficients, reconstructed pixel data, motion-compensated pixel data, or intra-predicted pixel data.

6. The video coding method of claim 1, wherein the evaluated visual quality is derived from checking at least one image characteristic that affects human visual perception, and the at least one image characteristic includes sharpness, noise, blur, edge, dynamic range, blocking artifact, mean intensity, color temperature, scene composition, human face, animal presence, image content that attracts more or less interest, spatial masking, temporal masking, or frequency masking.

7. The video coding method of claim 1, wherein the step of evaluating the visual quality comprises:
calculating a single visual quality metric according to the data involved in the coding loop; and
determining the evaluated visual quality solely based on the single visual quality metric.

8. The video coding method of claim 1, wherein the step of evaluating the visual quality comprises:
calculating a plurality of distinct visual quality metrics according to the data involved in the coding loop; and
determining each evaluated visual quality based on the distinct visual quality metrics.

9. The video coding method of claim 8, wherein the step of determining each evaluated visual quality based on the distinct visual quality metrics comprises:
determining a plurality of weighting factors; and
determining each evaluated visual quality by combining the distinct visual quality metrics according to the weighting factors.

10. The video coding method of claim 9, wherein the weighting factors are determined by training.

11. A video coding apparatus, comprising:
a visual quality evaluation circuit, arranged to evaluate visual quality based on data involved in a coding loop;
a rate controller, arranged to calculate pixel-based distortion by estimating pixel variance of a rate-controlled unit in a source frame, and refer to at least the evaluated visual quality and the pixel-based distortion for deciding a target bit allocation of the rate-controlled unit, wherein the rate controller performs a coarse decision according to one of the evaluated visual quality and the pixel-based distortion to determine a plurality of coarse bit allocations, and performs a fine decision according to another of the evaluated visual quality and the pixel-based distortion to determine at least one fine bit allocation from the coarse bit allocations, where the target bit allocation is derived from the at least one fine bit allocation; and a coding circuit, comprising the coding loop, the coding circuit arranged to encode the rate-controlled unit according to the target bit allocation.

12. The video coding apparatus of claim 11, wherein the rate-controlled unit is one coding unit or one frame.

13. The video coding apparatus of claim 11, wherein the data involved in the coding loop is raw data of the source frame.

14. The video coding apparatus of claim 11, wherein the data involved in the coding loop is processed data derived from raw data of the source frame.

15. The video coding apparatus of claim 14, wherein the processed data includes transformed coefficients, quantized coefficients, reconstructed pixel data, motion-compensated pixel data, or intra-predicted pixel data.

16. The video coding apparatus of claim 11, wherein the evaluated visual quality is derived from checking at least one image characteristic that affects human visual perception, and the at least one image characteristic includes sharpness, noise, blur, edge, dynamic range, blocking artifact, mean intensity, color temperature, scene composition, human face, animal presence, image content that attracts more or less interest, spatial masking, temporal masking, or frequency masking.

17. The video coding apparatus of claim 11, wherein the visual quality evaluation circuit calculates a single visual quality metric according to the data involved in the coding loop, and determines the evaluated visual quality solely based on the single visual quality metric.

18. The video coding apparatus of claim 11, wherein the visual quality evaluation circuit calculates a plurality of distinct visual quality metrics according to the data involved in the coding loop, and determines each evaluated visual quality based on the distinct visual quality metrics.

19. The video coding apparatus of claim 18, wherein the visual quality evaluation circuit determines a plurality of weighting factors, and determines each evaluated visual quality by combining the distinct visual quality metrics according to the weighting factors.

20. The video coding apparatus of claim 19, wherein the visual quality evaluation circuit determines the weighting factors by training.

21. A video coding method, comprising:

calculating pixel-based distortion by estimating pixel variance of a rate-controlled unit in a source frame;

utilizing a visual quality evaluation circuit for evaluating visual quality based on data involved in a coding loop; and referring to at least the evaluated visual quality and the pixel-based distortion for deciding a target bit allocation of the rate-controlled unit in video coding, comprising:

referring to the evaluated visual quality to find a first bit allocation;

referring to the pixel-based distortion to find a second bit allocation; and selecting one of the first bit allocation and the second bit allocation as the target bit allocation.

22. A video coding apparatus, comprising:

a visual quality evaluation circuit, arranged to evaluate visual quality based on data involved in a coding loop;

a rate controller, arranged to calculate pixel-based distortion by estimating pixel variance of a rate-controlled unit in a source frame, and refer to at least the evaluated visual quality and the pixel-based distortion for deciding a target bit allocation of the rate-controlled unit, wherein the rate controller refers to the evaluated visual quality to find a first bit allocation, refers to the pixel-based distortion to find a second bit allocation, and selects one of the first bit allocation and the second bit allocation as the target bit allocation; and a coding circuit, comprising the coding loop, the coding circuit arranged to encode the rate-controlled unit according to the target bit allocation.

* * * * *